(12) United States Patent
Shi et al.

(10) Patent No.: US 12,308,768 B2
(45) Date of Patent: May 20, 2025

(54) METHOD AND APPARATUS FOR CONTROLLING FLUX OF AN ELECTRIC DRIVE UNIT FOR HEAT GENERATION

(71) Applicant: GM GLOBAL TECHNOLOGY OPERATIONS LLC, Detroit, MI (US)

(72) Inventors: Yuying Shi, Novi, MI (US); Vinod Chowdary Peddi, Shelby Township, MI (US); Brian A. Welchko, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 18/299,979

(22) Filed: Apr. 13, 2023

(65) Prior Publication Data

US 2024/0348185 A1   Oct. 17, 2024

(51) Int. Cl.
*H02P 21/22* (2016.01)
*B60H 1/00* (2006.01)
*B60H 1/22* (2006.01)
*H02P 6/00* (2016.01)
*H02P 27/06* (2006.01)

(52) U.S. Cl.
CPC ......... *H02P 21/22* (2016.02); *B60H 1/00392* (2013.01); *B60H 1/2218* (2013.01); *H02P 27/06* (2013.01)

(58) Field of Classification Search
CPC .......... H02P 29/62; H02P 29/64; H02P 29/66
See application file for complete search history.

(56) References Cited

U.S. PATENT DOCUMENTS

| | | | |
|---|---|---|---|
| 2015/0295514 A1* | 10/2015 | Yamagami | B60L 58/12 363/98 |
| 2022/0169147 A1* | 6/2022 | Huang | B60L 58/27 |
| 2023/0163378 A1* | 5/2023 | Wang | H01M 10/425 318/139 |

* cited by examiner

*Primary Examiner* — Kawing Chan
*Assistant Examiner* — Charles S Laughlin
(74) *Attorney, Agent, or Firm* — Quinn IP Law

(57) ABSTRACT

A method and apparatus for operating an electric drive unit having an inverter operatively coupled to a polyphase alternating current (AC) motor includes receiving a torque command corresponding to a torque to be produced by the AC motor; receiving a heat level request corresponding to a heat to be generated within the electric drive unit; determining a final current command that is responsive to the torque command and to the heat level request, wherein the current command includes operating in a flux-intensifying region relative to a Maximum Torque Per Ampere (MTPA) curve; and commanding operation of the inverter responsive to the final current command.

19 Claims, 6 Drawing Sheets

METHOD AND APPARATUS FOR CONTROLLING FLUX OF AN ELECTRIC DRIVE UNIT FOR HEAT GENERATION

INTRODUCTION

Electrified vehicles, e.g., electric vehicles (EVs) and hybrid electric vehicles (HEVs), may include an electric drive system and one or more rechargeable energy storage systems (RESS), for example batteries and capacitors. The RESS may advantageously employ a thermal management system for removal and addition of heat for cabin heating, battery heating, etc. Likewise, the electric drive system may advantageously employ a thermal management system including removal of heat.

Electrified vehicles may employ heat sources, for example to provide cabin heat, and to manage a temperature of the RESS to an optimal temperature range for charging, discharging and extending RESS life. Heat sources often add components and system complexity to the electrified vehicle.

This disclosure relates to generation and utilization of heat from the electric drive system for use within an electrified vehicle.

SUMMARY

The concepts described herein provide a method, an apparatus, and/or a system for controlling an electric drive system that achieves a propulsion torque request, and optimizes an operator request for heat in relation to a motor-related or system-induced noise, vibration, and/or harshness (NVH).

An aspect of the disclosure may include a method for operating an electric drive unit having an inverter operatively coupled to a polyphase alternating current (AC) motor. The method includes receiving a torque command corresponding to a torque to be produced by the AC motor; receiving a heat level request corresponding to a heat to be generated within the electric drive unit; determining a final current command that is responsive to the torque command and to the heat level request, wherein the current command includes operating in a flux-intensifying region relative to a Maximum Torque Per Ampere (MTPA) curve; and commanding operation of the inverter responsive to the final current command.

Another aspect of the disclosure may include the flux-intensifying region being determined in relation to a Maximum Torque Per Ampere (MTPA) curve.

Another aspect of the disclosure may include determining a voltage level for the RESS; determining an initial current command for operating the AC motor that is responsive to the torque command based upon the voltage level for the RESS determining the flux level in the flux-intensifying region that is responsive to the heat level request; and determining the final current command based upon the initial current command and the flux level.

Another aspect of the disclosure may include determining the final current command that is responsive to the torque command and to the heat level request, wherein the current command includes operating in the flux-intensifying region relative to a Maximum Torque Per Ampere (MTPA) curve by determining a plurality of candidate current trajectories, wherein each of the plurality of candidate current trajectories is in the flux-intensifying region relative to the MTPA curve and are capable of producing the torque command in the AC motor; determining a plurality of flux levels corresponding to the plurality of candidate current trajectories; and selecting one of the plurality of candidate current trajectories that corresponds to one of the plurality of flux levels that is capable of producing the heat level request.

Another aspect of the disclosure may include the plurality of candidate current trajectories being determined based upon the torque command in the AC motor.

Another aspect of the disclosure may include determining for the plurality of candidate current trajectories, a parameter associated with noise-vibration-harshness (NVH); and determining, via the controller, the final current command that is responsive to the torque command and optimizes the heat level request in relation to the parameter associated with NVH, including operating in a flux-intensifying region.

Another aspect of the disclosure may include the plurality of candidate current trajectories being determined by referencing pairs of current magnitudes and phase angles defining current vectors, and resolving the current vectors into respective direct-axis current components and quadrature-axis current components.

Another aspect of the disclosure may include an apparatus for generating heat in a vehicle that includes an electric drive unit having a polyphase alternating current (AC) motor and an inverter, wherein the inverter is operatively coupled to the AC motor; and a motor controller, wherein the motor controller is operatively coupled to the inverter. The motor controller includes an instruction set, the instruction set being executable to: receive a torque command corresponding to a torque to be produced by the AC motor; receive a heat level request corresponding to a magnitude of heat to be generated within the electric drive unit; determine a final current command that is responsive to the torque command and to the heat level request, wherein the final current command includes operating in a flux-intensifying region; and command operation of the inverter responsive to the final current command.

Another aspect of the disclosure may include the flux-intensifying region being determined in relation to a Maximum Torque Per Ampere (MTPA) curve.

Another aspect of the disclosure may include a rechargeable energy storage system (RESS), wherein the RESS is electrically connected to the inverter to transfer electric power therebetween.

Another aspect of the disclosure may include the instruction set being executable to: determine a voltage level for the RESS; determine an initial current command for operating the AC motor that is responsive to the torque command based upon the voltage level for the RESS; determine the flux level in the flux-intensifying region that is responsive to the heat level request; and determine the final current command based upon the initial current command and the flux level.

Another aspect of the disclosure may include the instruction set being executable to determine the final current command that is responsive to the torque command and to the heat level request, including determining a plurality of candidate current trajectories, wherein the plurality of candidate current trajectories are in the flux-intensifying region relative to a Maximum Torque Per Ampere (MTPA) curve, are capable of producing the torque command in the AC motor, and are capable of generating the heat level request; determining a plurality of flux levels corresponding to the plurality of candidate current trajectories; and determining, as the final current command, one of the plurality of candidate current trajectories that corresponds to a maximum of the plurality of flux levels.

Another aspect of the disclosure may include the instruction set being executable to determine the final current command that is responsive to the torque command and to the heat level request, wherein the current command includes operating in the flux-intensifying region relative to a Maximum Torque Per Ampere (MTPA) curve by determining a plurality of candidate current trajectories, wherein the plurality of candidate current trajectories are in the flux-intensifying region relative to the MTPA curve and are capable of producing the torque command in the AC motor; determining a plurality of flux levels corresponding to the plurality of candidate current trajectories; and selecting one of the plurality of candidate current trajectories that corresponds to one of the plurality of flux levels that is capable of producing the heat level request.

Another aspect of the disclosure may include the plurality of candidate current trajectories being determined based upon the torque command in the AC motor.

Another aspect of the disclosure may include the instruction set being executable to determine for the plurality of candidate current trajectories, a parameter associated with noise-vibration-harshness (NVH); and determine the final current command that is responsive to the torque command and optimizes the heat level request in relation to the parameter associated with NVH.

Another aspect of the disclosure may include a heat exchanger, the heat exchanger being thermally coupled to the inverter; wherein the heat exchanger is arranged to transfer heat to a vehicle cabin.

Another aspect of the disclosure may include a rechargeable energy storage system (RESS), the RESS being thermally coupled to the inverter; wherein the inverter is arranged to transfer heat to the RESS.

Another aspect of the disclosure may include the inverter being composed of a plurality of solid-state power switches, and wherein the motor controller is further configured to control a switching frequency of the plurality of solid-state power switches to generate heat within the inverter.

Another aspect of the disclosure may include a method for operating an electric drive unit including an inverter operatively coupled to a polyphase alternating current (AC) motor that includes receiving a torque command corresponding to a torque to be produced by the AC motor; receiving a heat level request corresponding to a magnitude of heat to be generated within the electric drive unit; determining a current command that is responsive to the torque command and optimizes the heat level request in relation to the parameter associated with NVH; and commanding operation of the inverter responsive to the current command.

Another aspect of the disclosure may include determining the current command that is responsive to the torque command and optimizes the heat level request in relation to the parameter associated with NVH by determining a current command that includes operating in a flux-intensifying region relative to a Maximum Torque Per Ampere (MTPA) curve.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

Figure 1:
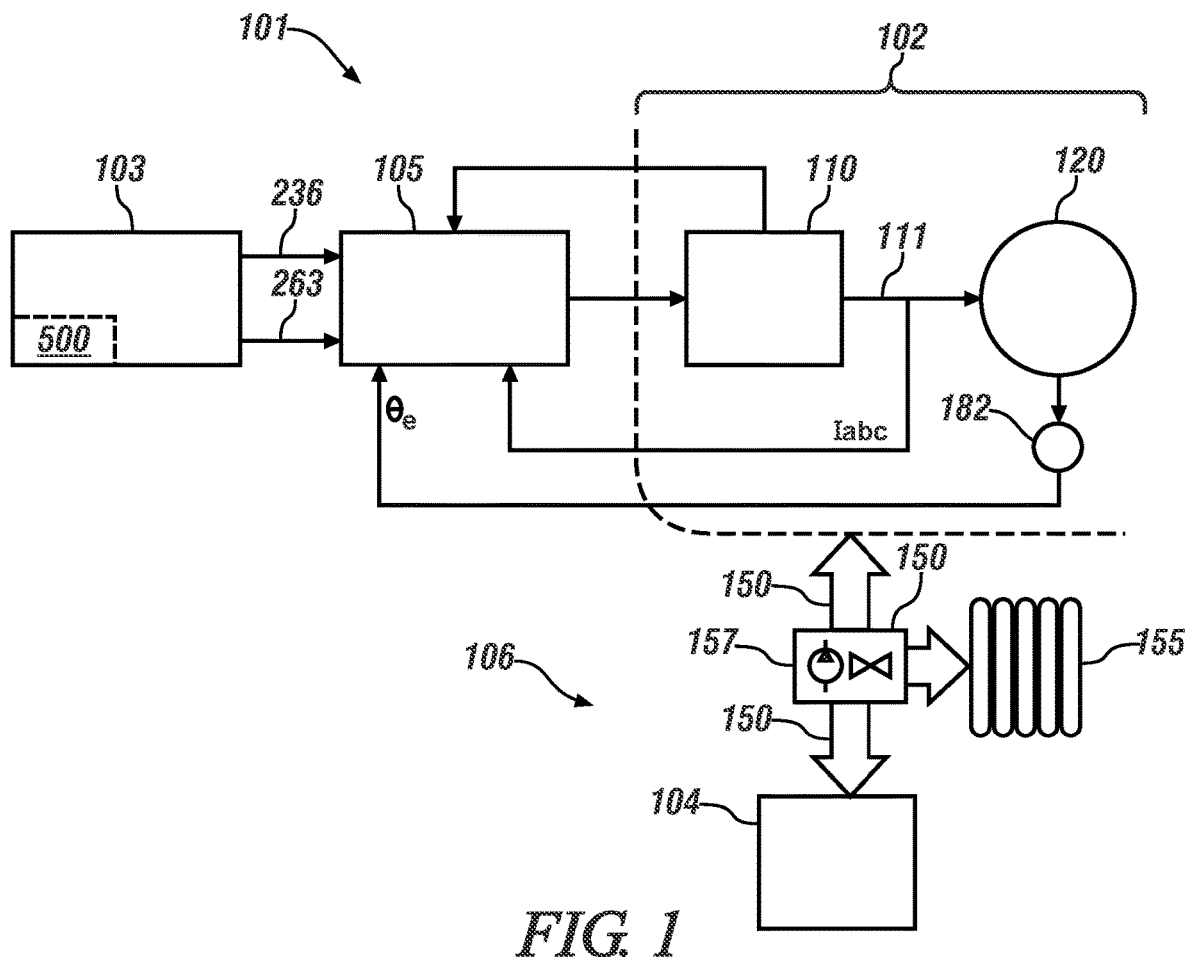
FIG. 1 schematically illustrates an embodiment of an electric drive system in a vehicular application, in accordance with the present disclosure.

The appended drawings may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The following description is merely illustrative in nature and is not intended to limit the present disclosure, its application or uses. The components of the disclosed embodiments, as described and illustrated herein, may be arranged and designed in a variety of different configurations. Thus, the following detailed description is not intended to limit the scope of the disclosure, as claimed, but is merely representative of embodiments thereof. In addition, while numerous specific details are set forth in the following description to provide a thorough understanding of the embodiments disclosed herein, some embodiments can be practiced without some of these details. Moreover, for the purpose of clarity, some technical material that is understood in the related art has not been described in detail to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Embodiments may be described herein in terms of functional and/or logical block components and various processing steps. Such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, the embodiments may be practiced in conjunction with other mechanical and/or electronic systems, and the vehicle systems described herein are merely embodiments of possible implementations.

The use of ordinals such as first, second and third does not necessarily imply a ranked sense of order, but rather may distinguish between multiple instances of an act or structure.

Referring to the drawings, wherein like reference numerals correspond to like or similar components throughout the several Figures, FIG. 1 schematically illustrates an embodiment of an electric drive system 101 in a vehicular application. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The electric drive system 101 may include various control components, electrical and electro-mechanical systems including, for example, a rechargeable energy storage system (RESS) 104 and an electric drive unit (EDU) 102, the operation of which is controlled by a vehicle controller 103 and a motor controller 105. The electric drive system 101 may be employed on drivetrain systems to generate propulsion torque as a replacement for or in conjunction with an internal combustion engine in various electric vehicle (EV) applications and hybrid electric vehicle (HEV) applications, respectively.

The vehicle controller 103 includes a control routine 500 that includes executable code to generate vehicle operating commands, including, e.g., a propulsion torque request (Tcmd) 236 and a heat level request 263. The propulsion torque request (Tcmd) 236 represents a magnitude of torque requested by a vehicle operator or a driver assistance system (e.g., an autonomous vehicle or a partially autonomous vehicle) to propel the vehicle. The heat level request 263 represents a magnitude of thermal energy that is to be generated by the electric drive system 101 and transferred between the EDU 102, the RESS 104, and a heat exchanger 155 to provide cabin heating, and thermal management in the form of heating or cooling of the RESS 104. The propulsion torque request (Tcmd) 236 and the heat level request 263 may be provided to the motor controller 105, as further described herein.

The term 'heat', and related terms relate to thermal energy that may be generated, transferred and/or rejected via conduction, convection, and/or radiation.

The RESS 104 may in one embodiment be a battery or battery pack, for example a high capacity, high voltage (e.g., nominal 400 volt) rechargeable lithium ion battery pack. High capacity battery packs may include a plurality of battery pack modules allowing for flexibility in configurations and adaptation to application requirements. For example, in vehicular applications, battery packs may be modular to the extent that the number of battery modules may be varied to accommodate a desired energy density or range objective of a particular vehicle platform, intended use, or cost target. Thus, battery packs may include a plurality of lithium ion modules that are fabricated from pluralities of lithium ion cells.

The electric drive unit EDU 102 may be configured at one of a variety of levels of complexity, componentry, and integration. An highly integrated EDU 102 may include, for example, an electric motor, reduction and differential gearing, housings including air and liquid cooling features, electrical bus structures, HV bus structures, power electronics (e.g., inverters), controllers, and other related components. The electric drive system 101 may include an alternating current (AC) electric machine (hereafter AC motor) 120 having a motor output shaft (not illustrated). The motor output shaft may transfer torque between the AC motor 120 and other driveline components (not illustrated), for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. There may be alternative arrangements for driveline components.

The AC motor 120 may be a polyphase AC motor that is arranged to receive polyphase AC power over a power bus (AC bus) 111 that is coupled to inverter module 110. In a non-limiting embodiment, and a described herein, the AC motor 120 is a three-phase motor and the inverter module 110 includes a three-phase inverter.

The inverter module 110 is configured as a plurality of power switches that are arranged as a plurality of power switch pairs that electrically connect in series between the positive and negative conductors of a high-voltage DC bus 24, which is connected to the RESS 104. As shown, the AC motor 120 is configured as a three-phase device, and the inverter module 110 includes three power switch pairs, each of which is connected to one of the phases (a, b, or c) of the AC motor 120. Each of the power switches of the power switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. The motor controller 105 includes an inverter gate drive circuit having a plurality of gate drives and a controller, wherein the inverter gate drive circuit generates control signals to control activation and deactivation of the power switches in response to the control signals, e.g., pulsewidth modulated (PWM) control signals, which originate from the motor controller 105. The inverter module 110 includes other electrical components including capacitors, resistors and other electrical circuit components to accomplish functions related to electrical noise suppression, load balancing and the like.

The inverter module 110 may employ pulsewidth modulating (PWM) control of the IGBTs to convert stored DC electric power originating in the RESS 104 to AC electric power to drive the AC motor 120 to generate torque. Similarly, the power inverter module 110 converts mechanical power transferred to the AC motor 120 to DC electric power to generate electric energy that is storable in the RESS 104, including as part of a regenerative braking control strategy when employed on-vehicle. The power inverter module 110 receives motor control commands from the motor controller 105 and controls inverter states to provide the motor drive and regenerative braking functionality.

Control of AC motors, such as three-phase permanent magnet synchronous rotary electric machines (electric machines) is accomplished using a three-phase pulsewidth modulated (PWM) inverter. A PWM inverter can be controlled in several different operating modes, including, e.g., a linear modulation mode and an over-modulation mode. One example of a linear modulation mode of operation is a space vector PWM (SVPWM) mode with linear modulation, e.g., up to 90% of a six-step operation, and one example of an over-modulation mode is a full six-step mode. One example of an overmodulation mode or a non-linear modulation mode of operation is discontinuous pulsewidth modulation (DPWM). Another example of an overmodulation mode or a non-linear modulation mode of operation is zero pulsewidth modulation (ZPWM). Inverter controls for AC motor applications may include fixed switching frequencies, for example switching frequencies around 10-12 kHz and PWM controls that minimize switching losses of the IGBTs or other power switches of the inverter module 110. However, in accordance with certain embodiments, inverter module 110 switching frequencies and PWM control may provide useful control parameters as further described herein.

The EDU 102 may include various passive and active thermal management features. Similarly, the RESS 104 may include various passive and active thermal management features. Heat generated within the EDU 102 is understood to include heat generated from sources within the EDU 102 including, by way of non-limiting examples, power electronics components such as IGBTs, current carrying components including AC and DC buses, bars, cables and other current conductors including stator windings, and mechanical sources such as friction. Heat may be removed from the EDU 102 via passive heat sinks including power electronics heat sinks and enclosure features. Similarly, heat generated within the RESS 104 may be removed from the RESS 104 via passive heat sinks and enclosure features. Heat may be transferred between the EDU 102, the RESS 104, and a heat exchanger 155 via fluid circulation paths 150 containing circulated fluid for example. The heat exchanger 155 may be one or more of a fluid/air radiator, a heater core, and/or another heat transfer device. Transferred heat may be radiated to the ambient environment or to a vehicle cabin via the heat exchanger 155. In accordance with one embodiment, heat from the EDU 102 may be selectively transferred to the RESS 104 via a fluid circulation loop 106 including circulation paths 150 and controllable circulation valves and pumps 157 thereby thermally coupling the EDU 102 and RESS 104. For example, fluid circulation loop 106 may be a closed system that transfers heat generated in the EDU 102 to the RESS 104 via fluid circulation paths 150 within the EDU 102 and the RESS 104 including a fluid circulating cooling plate within the RESS 104.

The AC motor 120 may be configured as a high-voltage polyphase electric motor/generator that converts stored electric energy to mechanical power and converts mechanical power to electric energy that may be stored in RESS 104 as described. The AC motor 120 includes a rotor and a stator (not illustrated) and an accompanying position sensor 182, which is a variable reluctance resolver in one embodiment. The position sensor 182 communicates with the motor controller 105 and is employed to monitor angular position of the rotor ($\theta_e$) of the AC motor 120. The angular position of the rotor ($\theta_e$) of the AC motor 120 is employed by the motor controller 105 to control operation of the inverter module 110 that controls the AC motor 120. The motor controller 105 may be co-located with the inverter module 110 or, alternatively, may be remotely located apart therefrom.

Control of the AC motor 120 may employ direct (d)-quadrature (q) transformations (abc-dq) to simplify analysis and control of the polyphase circuits operation of the AC motor 120. This permits reducing three AC quantities to two direct current (DC) quantities for ease of calculations and associated control in the two-dimensional dq reference frame. A stator motor current space vector can be defined in the dq reference frame with orthogonal components along the direct axis (d-axis) and quadrature axis (q-axis) such that a field flux linkage is aligned along the d-axis and a torque component is aligned along the q-axis. After execution of calculations, an inverse transformation (dq-abc) occurs to determine control commands for operating the motor that can be executed in the inverter module 110. Flux commands are used to determine a direct-current (Id) portion of control in the dq reference frame and torque commands correspond to the quadrature-current (Iq) portion of control in the dq reference frame.

Figure 2:
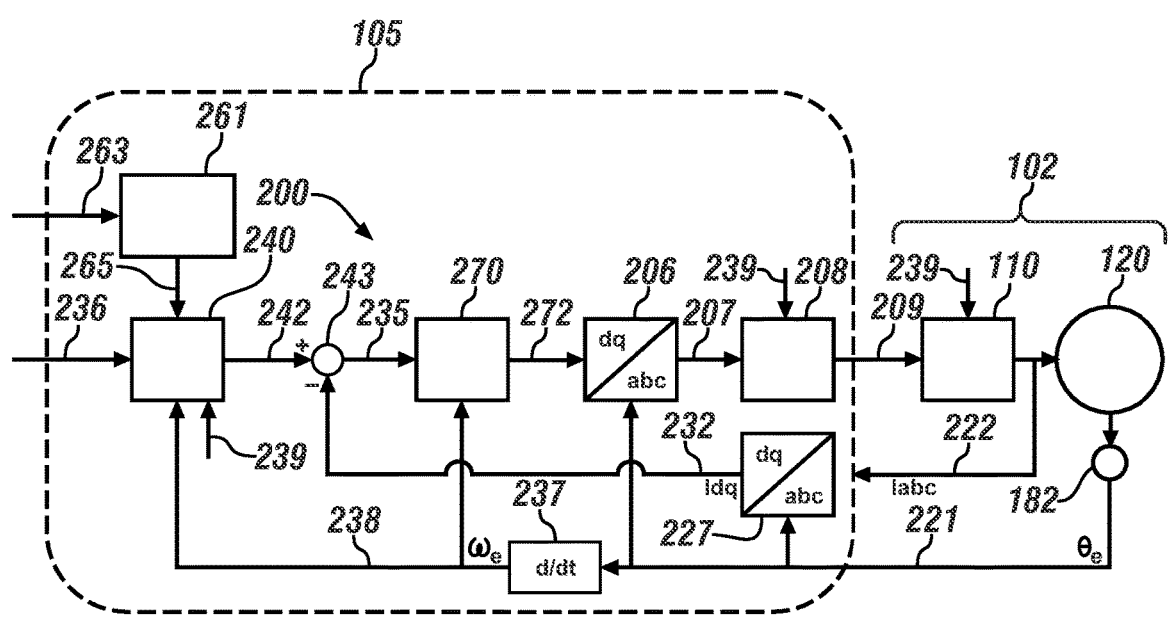
FIG. 2 schematically illustrates a motor controller and electric drive unit employing a field oriented controller, in accordance with the present disclosure.

FIG. 2 is a block diagram of a motor controller 105 and EDU 102 employing a field oriented controller (FOC) 200 in accordance with one embodiment. The EDU 102 may include an AC motor 120 and inverter module 110. Using a FOC control scheme, the FOC 200 controls the AC motor 120 via the inverter module 110 coupled to the three phase (abc) windings of the AC motor 120 so that the AC motor 120 can efficiently use a DC input voltage ($V_{dc}$) (i.e. HV DC bus voltage) provided to the inverter module 110 by adjusting current commands to the FOC controller 200.

In one embodiment, the three-phase AC motor 120 may be a three-phase, permanent magnet AC machine. However, the illustrated embodiment is only one non-limiting example of the types of polyphase AC machines that the disclosed embodiments may be applied to. The disclosed embodiments are not limited to a three-phase system, and in other embodiments, the AC motor 120 can have other numbers of phases, and further that the disclosed embodiments may be applied to any type of polyphase AC machine that includes fewer or more phases. In one particular implementation, the AC motor 120 may be a three-phase, permanent-magnet synchronous motor.

The AC motor 120 is coupled to the inverter module 110 via three inverter poles and generates mechanical power in the form of torque and speed based on three-phase current signals (Iabc) received from the inverter module 110. In the present embodiment, the angular position of a rotor ($\theta_e$) 221 is determined using the position sensor 182. A derivative function, or a virtual software observer, 237 of the angular position of a rotor ($\theta_e$) 221 with respect to time may be used to generate angular velocity ($\omega_e$) 238 of the AC motor 120.

The FOC 200 includes a command generation module 240, a current regulator module 270, a rotating orthogonal (dq) reference frame to static three-phase (abc) reference frame (dq-to-abc reference frame) transformation module 206, a pulse width modulation (PWM) generation module 208, and a static three-phase (abc) reference frame to rotating orthogonal (dq) reference frame (abc-to-dq reference frame) transformation module 227.

The command generation module 240 receives a torque command signal (Tcmd) 236, angular velocity ($\omega_e$) 238 of the shaft that is generated based on the derivative of the rotor position output ($\theta_e$) 221, and the DC input voltage (Vdc) 239 as inputs, along with other system parameters depending upon implementation. The command generation module 240 uses these inputs to generate d-axis and q-axis current trajectories (synchronous reference frame current trajectory or Idq-cmd) 242 that will cause the AC motor 120 to generate the commanded torque (Tcmd) at angular velocity ($\omega_e$) 238. Moreover, the synchronous reference frame current trajectories (Idq-cmd) 242 may be effective to generate heat utilized in the system as described further herein.

The abc-to-dq transformation module 227 receives measured three-phase stationary reference frame stator currents (Iabc) 222 that are fed back from the AC motor 120. The abc-to-dq transformation module 227 uses these three-phase stationary reference frame stator currents (Iabc) 222 to perform an abc-to-dq reference frame transformation to transform the three-phase stationary reference frame stator currents (Iabc) 222 into synchronous reference frame feedback current signals (Idq) 232. The process of stationary-to-synchronous conversion is understood and thus not described in further detail.

The current regulator module 270 receives, from summing node 243, the error (Idq-err) 235 between the synchronous reference frame current trajectories (Idq-cmd) 242 and the synchronous reference frame feedback current signals (Idq) 232 to generate synchronous reference frame voltage command signals (Vdq-cmd) 272. The synchronous reference frame voltage command signals (Vdq-cmd) 272 are DC commands that have a constant value as a function of time for steady state operation. Because the current commands are DC signals in the synchronous reference frame they are easier to regulate in comparison to AC stationary reference frame current commands. The process of current to voltage conversion by current regulator module 270 may be implemented as a proportional-integral (PI) controller, or another control arrangement.

The dq-to-abc reference frame transformation module 206 receives the synchronous reference frame voltage command signals (Vdq-cmd) 272, and based on these signals, generates stationary reference frame voltage command signals (Vabc-cmd) 207 (also referred to as "phase voltage signals" or "phase voltage command signals") that are sent to the PWM generation module 208. The dq-to-abc transformation may be performed using transformation techniques.

The inverter module 110 is coupled to the PWM generation module 208. The PWM generation module 208 is used for the control of pulse width modulation of the phase voltage command signals (Vabc-cmd) 207. Switching vector signals (Sabc) 209 are generated based on duty cycle waveforms that are internally generated by the PWM generation module 208 to have a particular duty cycle during each PWM period. The PWM generation module 208 modifies the phase voltage command signals (Vabc-cmd) 207 based on the duty cycle waveforms and the DC input voltage (Vdc) 239 to generate the switching vector signals (Sabc) 209, which it provides to the inverter module 110. The particular modulation algorithm implemented in the PWM generation module 208 may include continuous PWM techniques (e.g., Space Vector Pulse Width Modulation (SVPWM)) or discontinuous PWM (DPWM) techniques to create AC waveforms that drive the AC motor 120 at varying angular velocities based on the DC input voltage (Vdc) 239. The discontinuous PWM has lower switching losses and hence less heat generation than continuous PWM under most operating conditions. Moreover, the switching frequency implemented in the PWM generation module 208 may be fixed or variable in accordance with various control objectives and efficiency tradeoffs. For example, higher switching frequencies may result in higher switching losses and greater heat generation in the power switches of the inverter module 110. While it may be generally desirable to minimize switching losses, higher switching frequencies may be advantageously employed when heat generation is a desired control objective. Thus, a baseline operation of the PWM generation module 208 may be at a relatively low switching frequency (e.g., 10-12 kHz) with DPWM when overall efficiency is the controlling objective. However, when additional heat generation is a desired objective, higher switching frequencies (e.g., 20 kHz, 25 kHz, 30 kHz) and alternative PWM modulation (e.g., SVPWM) may be employed, individually or in combinations.

The switching vector signals (Sabc) 209 control the switching states of switches in the inverter module 110 to generate the respective phase voltages at each phase winding of the AC motor 120. The switching vector signals (Sabc) 209 are PWM waveforms that have a particular duty cycle during each PWM period that is determined by the duty cycle waveforms that are internally generated at the PWM generation module 208. The AC motor 120 receives the three-phase voltage signals generated by the inverter module 110 and generates a machine output at the commanded torque (Tcmd) 236.

Figure 3A:
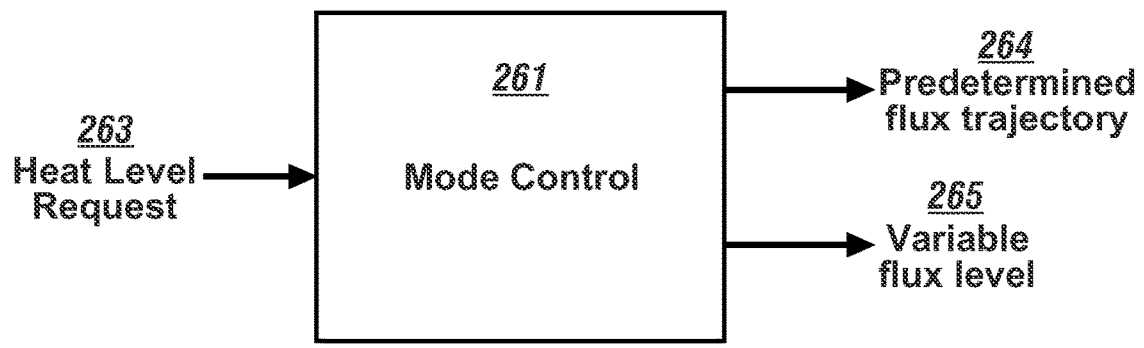
FIGS. 3A and 3B schematically illustrate embodiments of the mode management module and command generation module illustrated in FIG. 2, in accordance with the present disclosure.
Figure 3B:
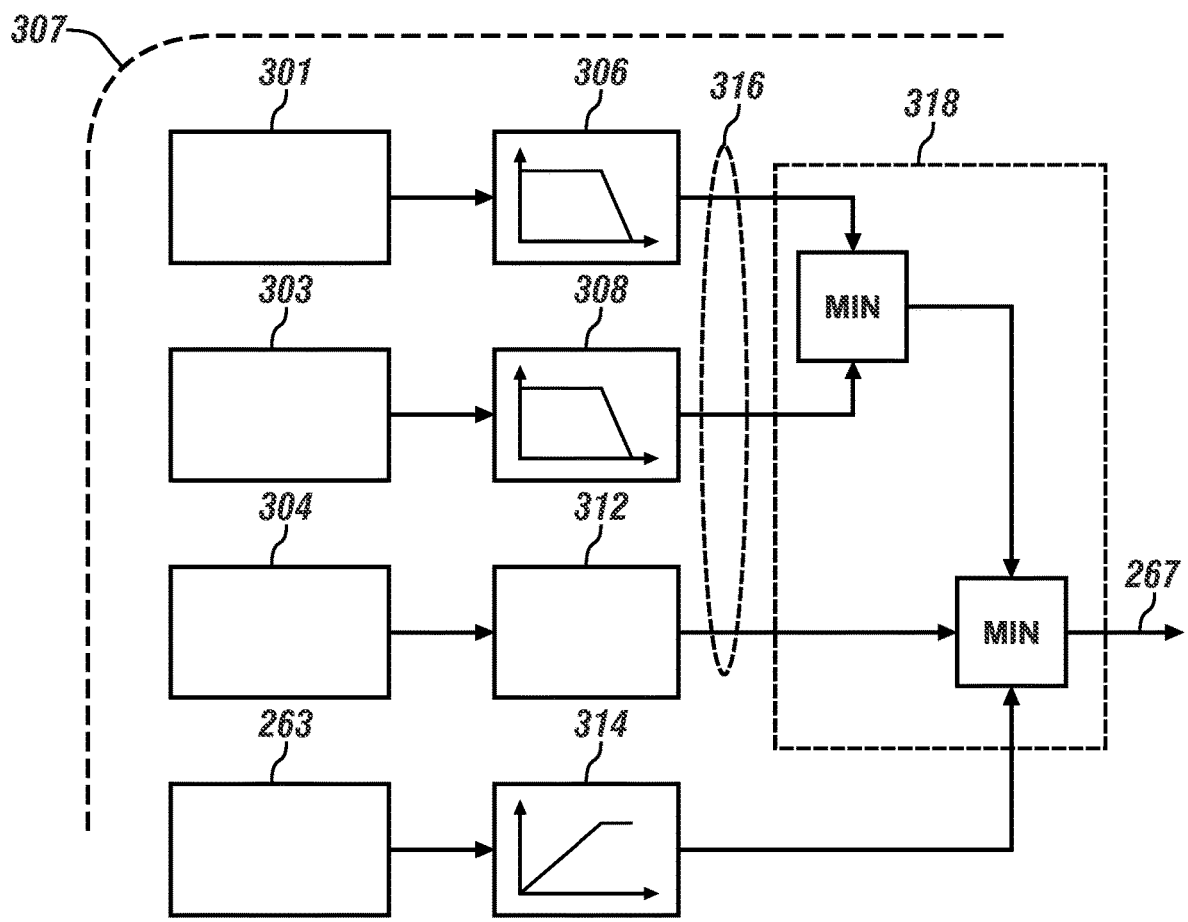

FIGS. 3A and 3B illustrate embodiments of the mode management module 261 and command generation module 240 illustrated in FIG. 2. With reference to FIG. 3A, the mode management module 261 may receive heat level request 263 as previously described, for example from vehicle controller 103 in FIG. 1. Command generation module 240 may receive torque command signals (Tcmd) 236, angular rotation angular velocity ($\omega_e$) 238 of the shaft of the AC motor 120, and the DC input voltage (Vdc) 239.

In the embodiment of the mode management module 261 of FIG. 3A, additional EDU 102 temperature inputs 305 including from temperature sensors 301 and temperature estimators 303 may be obtained. Such temperature inputs may provide temperature information relative to EDU 102 electrical and mechanical components such as active inverter components (e.g., IGBTs, diodes, junction devices), passive inverter components (e.g., capacitors), current conductors and bus bars, motor rotor, stator and shaft, and housing and enclosure, for example. The temperature inputs 305 and heat level request 263 are used by a current determination module 307 to determine a maximum current magnitude (Iss-heat) 267 that is allowed considering various temperature and current inputs. For example, a general case of higher temperatures of any given active inverter component may indicate a lower maximum current. The mode control module 309, based upon the heat level request 263, the maximum current magnitude (Iss-heat) 267 and other system inputs 311, for example vehicle controller 103 requests or EDU 102 parameters, provides the mode control signal 265 output from the mode management module 261 which, in the present embodiment, may include the maximum current magnitude (Iss-heat) and other mode information as described herein.

With reference to FIG. 3B, one embodiment of determining maximum allowable current magnitude (Iss-heat) by the current determination module 307 is illustrated. Information from the temperature sensors 301 and the temperature estimators 303 may be evaluated against respective temperature limit calibrations 306 and 308. For example, the temperature limit calibrations 306 and 308 may relate current limits to the temperature information in simple look-up tables. Stator current information 304, for example the synchronous reference frame feedback current signals (Idq) 232, may be evaluated against a current-time profile 312, it being generally understood that lower currents may be acceptable for longer periods of time whereas larger currents may be acceptable for shorter periods of time. The heat level request 263 from the vehicle controller 103 may be evaluated by a current determination module 314 which maps the heat level request 263 to a desired maximum current. Such mapping may be by way of any appropriate means including calculated output values based on a predefined linear or non-linear function or through a look-up table for example. The various evaluations 306-312 may produce a plurality of respective current limits 316 which may be subjected to an arbitration process 318 including, for example, selection of the minimum returned one of the plurality of respective current limits 316 and desired maximum current in order to settle upon the maximum current magnitude (Iss-max) 267. Unless one of the current limits from evaluations 306-312 is less than the desired maximum current from the current determination module 314 based on the heat level request 263, the maximum allowable current magnitude (Iss-heat) 267 will correspond to the desired maximum current from the current determination module 314.

With reference to FIG. 3A, the mode control 261 includes following a predetermined flux trajectory 264 or a variable flux level 265 based upon the heat level request 263, and may be associated with operating to generate heat. A system or user request for a mode may be implemented in accordance with system requirements, priorities and opportunities. For example, optimal noise, vibration and harshness (NVH) may be requested by a user during extended periods of slow, crawling traffic to improve ride experience. Alternatively, an optimal NVH mode may be system-invoked during aggressive acceleration events. However, a system request for a maximum heat generation may override another operator or system request when rapid heat generation is desirable, for example for cabin heating or raising the temperature of the RESS 104 after a cold soak period. Heat generation may be less than the maximum heat generation mode and may be variable in accordance with an operator or system request, for example to maintain a target cabin temperature or to maintain RESS 104 temperature to a predetermined operating target.

In the embodiment of the command generation module 240 of FIG. 3A, torque command signal (Tcmd) 236, angular velocity ($\omega_e$) 238 of the shaft of the AC motor 120, and the DC input voltage (Vdc) 239 are used in a current trajectory configuration module 333 to determine a plurality of candidate current trajectories 315 (e.g., Idq-1 . . . Idq-n) as described further herein. As used herein, current trajectories are understood to include current operating points along the trajectory and corresponding current commands for use by the FOC controller 200. Reference to a current trajectory may include a current command to a current operating point, for example in a regularly executed control loop of the FOC controller 200. In one embodiment, the plurality of candidate current trajectories 315 may be determined through calibration look-up tables. Multiple libraries of tables may be used and particular libraries selected based upon mode information as described further herein. Selection of one of the plurality of candidate current trajectories 315 for use in establishing the synchronous reference frame current trajectories (Idq-cmd) 242 in the FOC 200 for achieving the torque and heat objectives may be made in accordance with an arbitration module 331 in response to the mode control signal 265 from the mode control module 309 of mode management module 261. The mode control signal may include the maximum current magnitude (Iss-heat) and mode selection information determined in accordance with system and user requests, settings and preferences as discussed herein.

Figure 4:
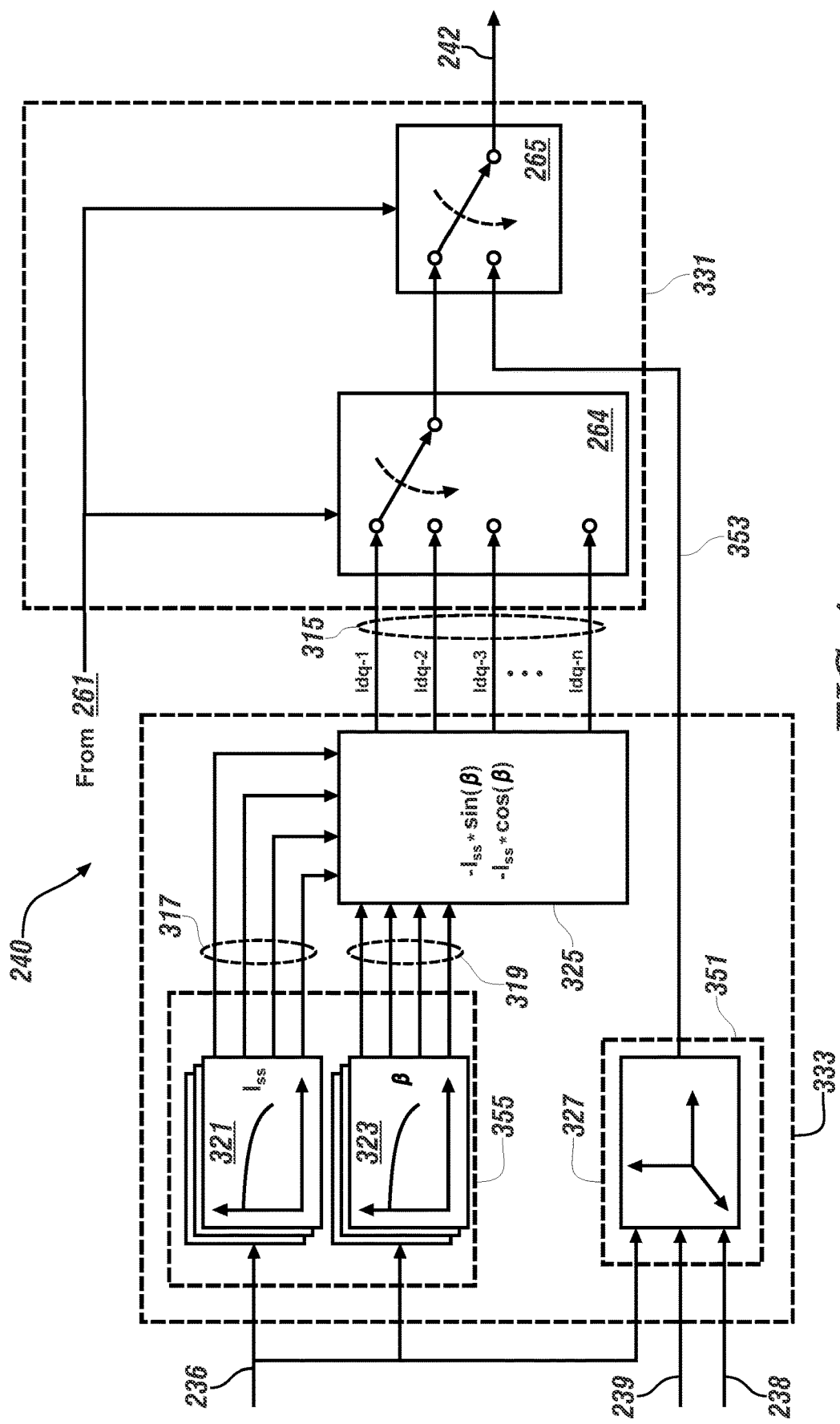
FIG. 4 schematically illustrates an embodiment of the command generation module illustrated in FIG. 3A, in accordance with the present disclosure.

In accordance with one embodiment, and with further reference to FIG. 4, a command generation module 240 may include a trajectory configuration module 333 and an arbitration module 331. Torque command signals (Tcmd) 236, angular velocity ($\omega_e$) 238 of the shaft of the AC motor 120, and the DC input voltage (Vdc) 239 are provided to the current trajectory configuration module 333. In accordance with one embodiment, a first library 351 may be referenced using the torque command signals (Tcmd) 236, angular velocity ($\omega_e$) 238 of the shaft of the AC motor 120, and the DC input voltage (Vdc) 239 to return a current trajectory 353. Library 351 includes one or more tables including current trajectories corresponding to the MTPA curve (A-B) 403, the current limit circle (B-C) 405 and the MTPV curve (C-D) 409. Library 351 essentially provides current trajectories for use in optimal efficiency modes (e.g., mode 371) not particularly targeting a heat production or other control objectives (e.g., NVH) by the EDU 102. A second library 355 may be referenced using the torque command signals (Tcmd) 236 to return a plurality of current vectors defining a plurality of candidate current trajectories. A first set of tables 321 returns current magnitudes 317 and a second set of tables 323 returns corresponding phase angles 319. The pairs of current magnitudes 317 and phase angles 319 define current vectors which are provided to resolver 325 to return a plurality of candidate current trajectories 315 (e.g., Idq-1 . . . Idq-n). The candidate current trajectories 315 (e.g., Idq-1 . . . Idq-n) and the respective trajectory torques are capable of meeting the torque command signals (Tcmd) 236 but at varying net heat production (and NVH impact) within the EDU 102 through selective placement within the operating region 401. Library 355 essentially provides current trajectories of varying aggressiveness or rates of heating for use in heat generation within the EDU 102. The mode control signal 265 may determine, through arbitration module 331, whether the current commands 353 from the first library 351 providing a current trajectory for use in optimal efficiency modes or one of the plurality of candidate current trajectories 315 derived from the second library 355 providing current trajectories for use in heating modes. The mode control signal 265 may also determine, through selector 264 of the arbitration module 331, which of the candidate current trajectories 315 is to be employed to meet the torque, heat, and NVH objectives when a heating mode is indicated based upon parameter optimization.

Additional heat production within EDU 102 may be effected by increasing gate resistance of gate resistors 112 between the PWM generation module 208 and the IGBTs of the inverter module 110 and/or by increasing the switching frequency of the inverter module 110 and/or by employing more lossy PWM techniques (e.g., continuous PWM such as SVPWM). These additional or alternative techniques may advantageously increase heat generation at the IGBTs or other inverter switching devices yet do not result in any appreciable heat changes to the DC side components (e.g., buses, bars, cables and other current conductors) since these techniques do not depend upon increases in current. Thus, at current limits, for example as determined by current determination module 307, manipulating one or more of gate resistance, switching frequency or PWM technique may increase heat generated within the EDU 102 beyond that achievable through current increasing current trajectories due to current limits.

Figure 5:
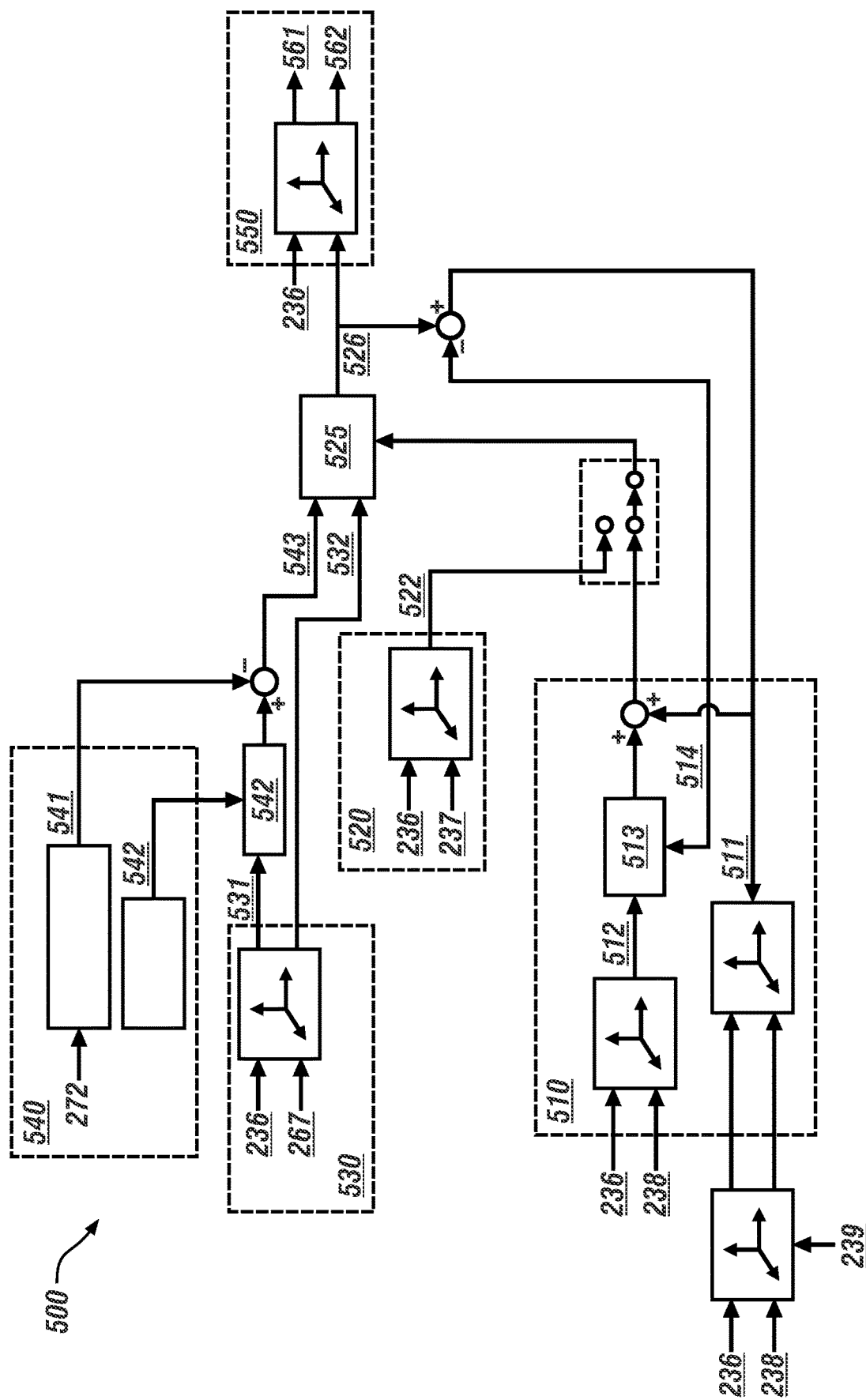
FIG. 5 schematically illustrates aspects of a control routine for controlling an embodiment of an electric drive system, in accordance with the present disclosure.

FIG. 5 schematically illustrates algorithm 500 which may be employed to determine a final current command, i.e., dq current commands 561, 562, which has been optimized in response to the torque command and the heat level request while accounting for and minimizing NVH. The final current command includes operating in a flux-intensifying region.

The algorithm 500 includes a flux determination portion 510, torque trajectory portion 520, a minimum and maximum flux portion 530, a flux margin portion 540, and final current portion 550.

The flux determination portion 510 determines a particular iq, id pair (MTPA Id*, MTPA Iq*) that causes minimum phase currents based upon inputs of torque command (Tcmd) 236, angular velocity ($\omega_e$) 238 of the shaft of the AC motor 120, and the DC input voltage (Vdc) 239, from which an ideal steady state flux (MTPA $\lambda_{ss}$) 511 is determined. An example of an MTPA curve is illustrated with regard to FIG. 7A.

The flux determination portion 510 also determines a differential flux ($\Delta\lambda_{ss}$) 512 based upon the torque command (Tcmd) 236, angular velocity ($\omega_e$) 238, which is subjected to a low pass filter 513 and added to the ideal steady state flux (MTPA $\lambda_{ss}$) 511 to determine a variable flux 514. The low pass filter on the delta flux with adjustment of the feedback signal enables fast and smooth flux dynamics.

The torque trajectory portion 520 determines a variable flux, i.e., a flux trajectory ($\lambda$ss-trajectory) 522 based upon the torque command (Tcmd) 236 and angular velocity ($\omega_e$) 238.

The flux margin portion 540 determines a flux margin 541 based upon the voltage command signals (Vdq-cmd) 272, and also determines a maximum flux term 542 based upon maximum voltage (Vmax) and angular velocity ($\omega_e$) 238. Actual voltage Vdq. This is a closed loop feedback control to adjust the flux upper limit so that the feedback voltage stays within a reference value for maximum loss generation.

The minimum flux portion 530 employs the torque command (Tcmd) 236 and the maximum current magnitude (Iss-heat) 267 to determine an initial maximum available flux 531 and a minimum flux ($\lambda$ss-min) 532. The minimum flux portion 530 is limited based upon temperature and current. The flux margin portion 540 is limited based upon voltage.

A minimum value of the initial maximum available flux 531 and the maximum flux term 542 are reduced by the flux margin 541, and the resultant value becomes the maximum flux ($\lambda_{ss\text{-}min}$) 543.

One of the flux trajectory ($\Delta\lambda_{ss\text{-}trajectory}$) 522 or the variable flux 514 is selected as the flux loss term ($\lambda_{ss,loss}$) 524 based upon the mode, as described with reference to FIG. 3.

The flux loss term ($\lambda_{ss,loss}$) 524 is input to a limiter 525, which imposes limits based upon the minimum flux ($\lambda_{ss\text{-}min}$) 532 and the maximum flux ($\lambda$ss-min) 543 to determine a loss-limited flux term ($\lambda_{ss\text{-}loss\ limited}$) 526.

The final current portion 550 employs the loss-limited flux term ($\lambda_{ss\text{-}loss\ limited}$) 526 and the torque command (Tcmd) 236 to determine the final current command, i.e., dq current commands 561, 562, which has been optimized in response to the torque command and the heat level request while accounting for and minimizing NVH.

Figure 6:
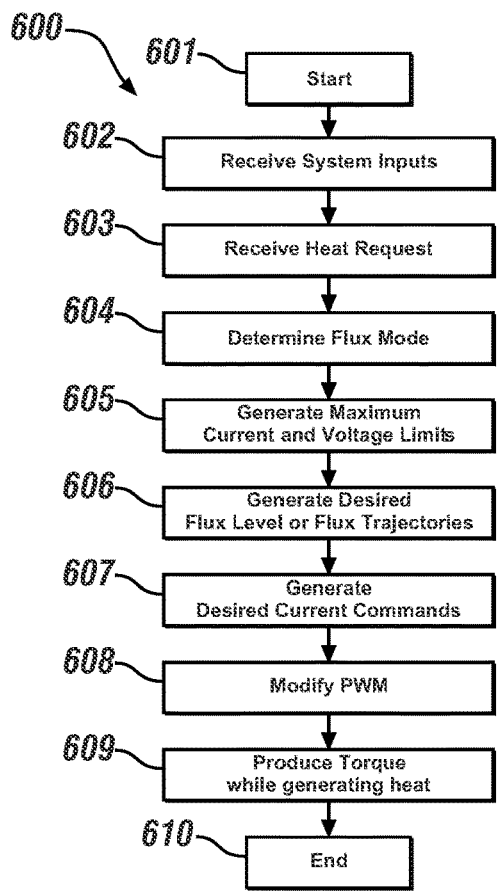
FIG. 6 schematically illustrates aspects of a control routine for controlling an embodiment of an electric drive system, in accordance with the present disclosure.

FIG. 6 schematically illustrates a control routine 600, in flowchart form, that may be periodically executed to generate the propulsion torque requests (Tcmd) 236 and the heat level request 263 for controlling an embodiment of the electric drive system 101 that is described with reference to FIG. 1. The control routine 600 employs the algorithm 500 described with reference to FIG. 5 to determine a final current command, i.e., dq current commands 561, 562.

Each iteration (Step 601), the control routine 600 receives system inputs, which may be in the form of vehicle operating parameters, power storage parameters, operator requests including the propulsion torque request (Tcmd) 236, etc. (Step 602), and a thermal heat request (Step 603). The thermal heat request may be based upon an operator request for cabin heating, a request for heating of the RESS 104, and/or another heating request, i.e., the heat level request 263.

A flux mode is selected, the flux mode being one of a flux weakening mode, a flux optimizing mode, or a flux intensifying mode, and is based upon the thermal heat request (Step 604). A maximum current limit and a maximum voltage limit are determined for the system based upon the various electric power demands, including the propulsion torque request (Tcmd) 236 and the heat level request 263 that are determined during Steps 602 and 603 (Step 605).

The controller determines a desired flux level and a flux trajectory based upon the aforementioned parameters (Step 606), which is employed to determine desired current commands (Step 607). Details related to these steps are described with reference to the algorithm 500 that is described with reference to FIG. 5.

Referring again to FIG. 6, the desired flux level and flux trajectory are selected to provide a current command that achieves a propulsion torque request in the electric drive system 101 at an electric power consumption level that has a thermal capability that meets or achieves the operator request for heat while optimizing the heat level request in relation to motor-related or system-induced noise-vibration-harshness (NVH) parameters.

The controller 103 controls the PWM command to the inverter module 105 based upon the desired current trajectory (Step 608), which operates the AC motor 120 to generate torque and produce heat while minimizing NVH (Step 609), and this iteration ends (Step 610). Operating the AC motor 120 to generate torque and produce heat while minimizing NVH (Step 609) occurs by manipulating flux as a control variable to generate losses in the motor and inverter that are transformed to heat without sacrificing desired torque dynamics, and further achieving at least equivalent NVH performance.

Figure 7A:
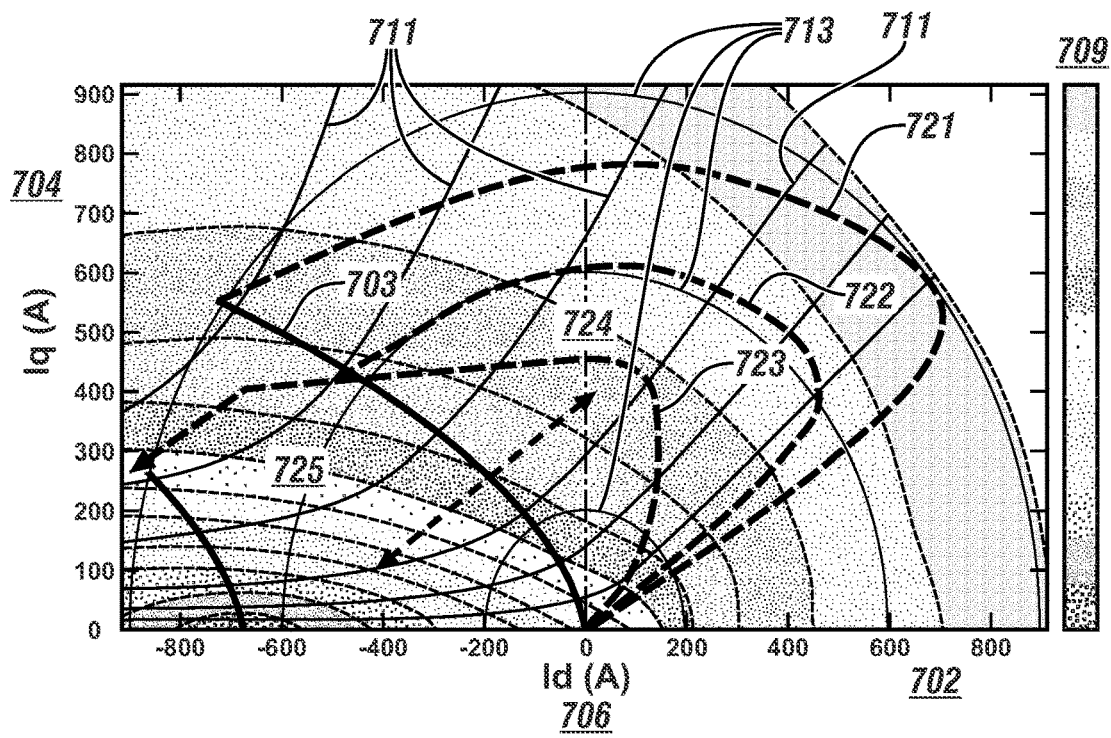
FIGS. 7A and 7B graphically illustrate operating quadrants of a dq reference frame for an embodiment of the electric drive system, in accordance with the present disclosure.
Figure 7B:
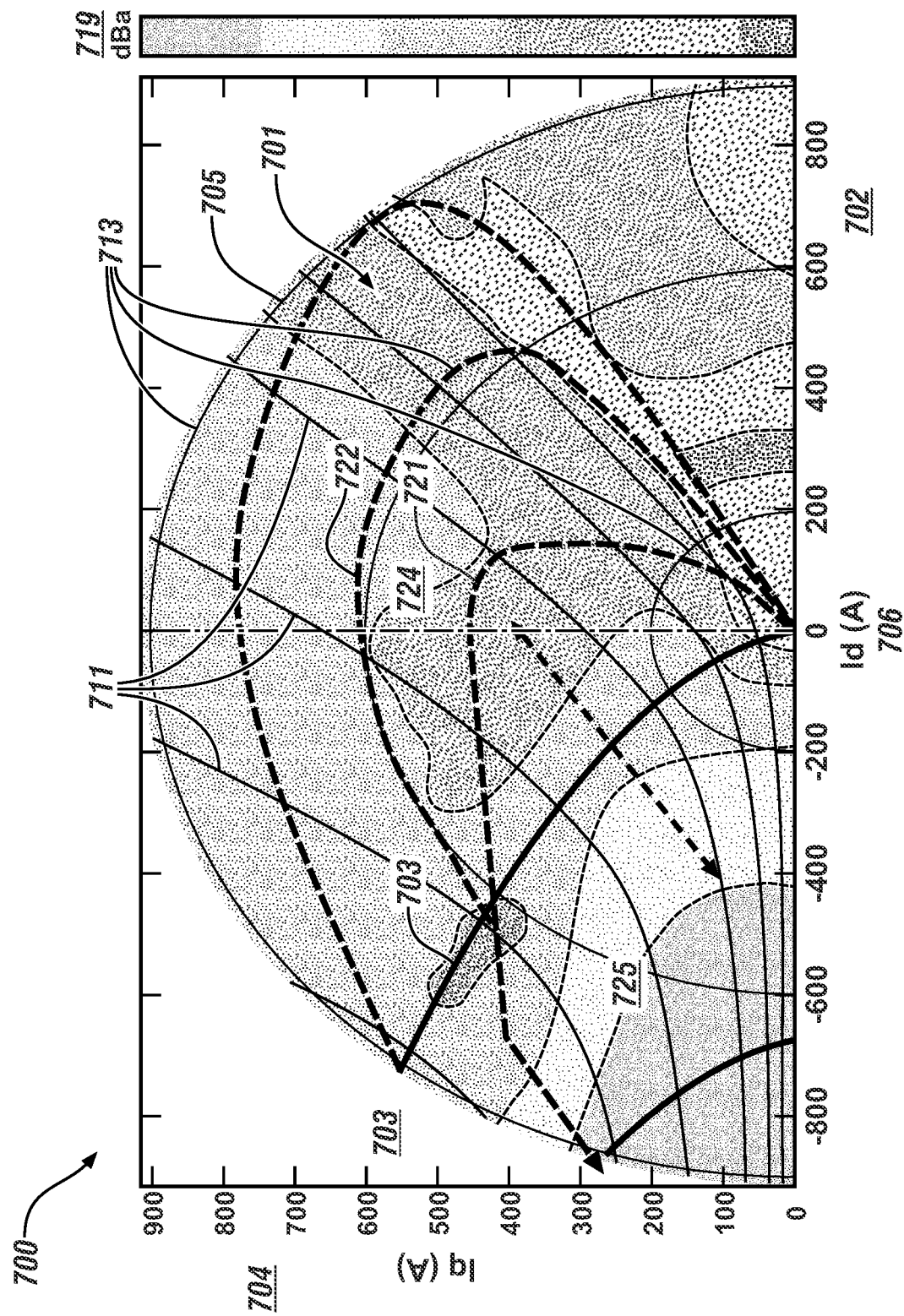

FIGS. 7A and 7B graphically illustrate various operating parameters in context of first and second quadrants of a dq reference frame 700 for motor currents, which are defined by the horizontal d-axis 702 and vertical q-axis 704 intersecting at the reference frame origin 706, with flux 709 varying between a flux weakening region and a flux intensifying region.

FIG. 7A provides a representation of operation in the dq reference frame 700 and includes additional detail regarding current trajectories that may be implemented to achieve the propulsion torque request (Tcmd) 236 at an electric power consumption that has a thermal capability that meets or achieves the operator request for heat while optimizing motor-related noise-vibration-harshness (NVH) parameters.

The dq reference frame depicts a plurality of constant torque curves 711 for the AC motor 120, a plurality of constant current curves 713 for the three-phase motor 120, and a maximum torque per ampere (MTPA) curve (A-B) 703. The points on the MTPA curve 703 have the shortest distances from the origin 706 of the dq reference frame 700 to the constant torque curves 711 (i.e., tangential intersection of the constant torque curves 711 and current magnitude circles). Thus, the MTPA curve 703 represents the most efficient torque operation (i.e., minimum current for torque production). For any torque level, there exists a particular iq, id pair that minimizes phase currents, which defines the MTPA curve 703. Since resistive loss in the stator solely depends on phase current magnitudes, it is preferred to operate the AC motor 120 as close as possible to the iq, id pairs under most operating conditions to maximize the torque output for a particular amount of current.

The MTPA curve 703 also represents an ideal or optimal flux magnitude, with a flux weakening region 725 being defined by operating points that are leftward of the MTPA curve 703, and a flux intensifying region 724 being defined by operating points that are rightward of the MTPA curve 703. Heat is generated by operating in either the flux weakening region 725 or the flux intensifying region 724 relative to the MTPA curve 703.

A plurality of current trajectories that have been optimized based upon one or more NVH parameters, thermal capability, and an operator heat request are indicated, including, by way of non-limiting examples, a first current trajectory 721, a second current trajectory 722, and a third current trajectory 723, which correspond to increasing magnitudes of heat being generated by the inverter module 110. The plurality of current trajectories are achieved by manipulating flux magnitude in relation to the flux associated with the MTPA curve 703. The third trajectory 723 This trajectory is not operating in flux intensifying direction. Instead, it is transitioning from the flux intensifying region into the flux weakening region. Transitioning into the flux weakening region may be at high speed when there is no margin for flux intensifying.

Certain operational boundaries within the dq reference frame 700 are adhered to either as control objectives or control limits, including a current limit circle 705, and the d-axis (D-A) 702. A general control axiom requires Idq operation within the operating region 701 as set forth. As is appreciated, the d-axis is an indicator of torque polarity, with positive torque/motoring mode being above the d-axis, and the negative torque/regenerative mode being below the d-axis. Only the first and second quadrants are shown, which correspond to the motoring mode. When operation in the regenerative mode, it will be mirrored to the third and fourth quadrants. The current limit still the same, and whether above or below D axis depends on torque polarity.

FIG. 7B corresponds to the operating parameters of FIG. 7A by providing a representation of operation in the dq reference frame 700 including the current trajectories that may be implemented to achieve the propulsion torque request (Tcmd) 236 at an electric power consumption that has a thermal capability that meets or achieves the operator request for heat and minimizes motor-related noise-vibration-harshness (NVH) parameters. Also illustrated is an NVH parameter in the form of magnitude of vibration (dBa) 719 for a selected harmonic order that may be induced by operating the AC motor 120 at various operating points within the region.

The results indicate that the magnitude of induced vibration 719 decreases with an increase in the flux in the flux intensifying region 724, but increases with a decrease in the flux in the flux weakening region 725.

The dq reference frame 700 depicts a plurality of constant torque curves 711 for the three-phase motor 120, a plurality of constant current curves 713 for the three-phase motor 120, and a maximum torque per ampere (MTPA) curve (A-B) 703. The points on the MTPA curve 703 have the shortest distances from the origin 706 of the dq reference frame 700 to the constant torque curves 711 (i.e., tangential intersection of the constant torque curves 711 and current magnitude circles). Thus, the MTPA curve 703 represents the most efficient torque operation (i.e., minimum current for torque production).

The MTPA curve 703 also represents an ideal or optimal flux magnitude, with a flux weakening region 725 being defined by operating points that are leftward of the MTPA curve 703, and a flux intensifying region 724 being defined by operating points that are rightward of the MTPA curve 703.

A plurality of current trajectories that have been optimized based upon one or more NVH parameters, thermal capability, and an operator heat request. The plurality of current trajectories are achieved by manipulating flux magnitude in relation to the flux associated with the MTPA curve 703. These include, by way of non-limiting examples, a first current trajectory 721, a second current trajectory 722, and a third current trajectory 723, which correspond to increasing flux and increasing magnitudes of heat that are being generated by the inverter module 110.

Referring again to the control routine 600 of FIG. 6, the desired current trajectory (Step 607) controls the flux level in the flux intensifying region 724 to achieve low beta angle current trajectories to achieve low values for the NVH parameters while generating heat, as illustrated with reference to the first current trajectory 721 that is illustrated in FIGS. 7A and 7B.

Referring again to FIG. 6, the plurality of candidate current trajectories are determined based upon the various electric power demands, including the propulsion torque request (Tcmd) 236 and the heat level request 263 that are determined during Steps 602 and 603 (Step 605). This may include commanding operation in the flux intensifying region at low speeds and the flux weakening direction at higher speeds for extended loss generation capability. This may include applying constraints on loss generation capability (i.e., flux amplitude) using current limits as a function of time and temperature based on component limits. This may allow for smooth transition into MTPA and MTPV and mode switching allowing for smooth vehicle operation during rapid acceleration and deceleration.

Speed/Torque operating-point-dependent loss generation is achieved by adjusting the flux level with regard to the baseline MTPA flux (delta flux). The delta flux is filtered for smooth transition between MTPA flux and lossy flux. Thus, flux is being manipulated to achieve a reduction in NVH while deviating from the MPTV operating point to increase heat.

Furthermore, configurable lossy flux trajectories may be predefined for different objective functions, such as different levels of heat generation and optimal NVH performance on selective harmonic orders, with limits.

Furthermore, adjustment of the loss generation capability based on current limits may be defined by operating time and temperature limits that are circumscribed by component limits of the hardware, e.g., temperature limits on the power switches.

Furthermore, operation within voltage limits may be achieved by derating flux intensifying capability using both feedforward and closed loop feedback control.

The heat generated from the inverter module 110 and AC motor 120 may be directed into the fluid circulation loop 106 to precondition the RESS 104, thus improving cold weather performance. This may further facilitate a downsizing or removal of a coolant heater.

The proposed algorithm operates in all 4 quadrants of the motor at a lower beta angle allowing for significantly better NVH performance as compared to operation at higher beta angles associated with flux weakening regions. This is achieved by manipulating flux as a control variable to generate more losses/heat in the AC motor 120 and inverter module 110 without sacrificing desired torque dynamics, while achieving better or equivalent NVH performance.

In one embodiment, a current trajectory may be defined linearly as points along a line up to and including a maximum current. Thus, a trajectory may be a vector defined by a maximum current magnitude, such as the value Iss-heat 267 and an arbitrary phase angle ($\beta$). In another embodiment, a current trajectory may be defined curvilinearly, for example as an arc of points along a current circle as discussed herein. Such a current circle may also correspond to the value Iss-heat 267. In another embodiment, a current trajectory may be defined as a combination of linearly and curvilinearly defined portions, for example a vector and an arc. In one embodiment, a current trajectory may include a vector and an arc between the head or terminal end of the vector and the MTPA trajectory including an intersecting operating point. In another embodiment, for example when heat generation and NVH objectives are desired, certain sub-regions within the operating region 701 may be avoided. Such selective operation may be beneficial where, for example, a particular sub-region is undesirable, for example because of NVH issues associated with that sub-region.

Thus, under cold weather operating conditions, the AC motor 120 and inverter module 110 may function as heat generators by generating extra loss in both the motor and the inverter, without increasing the noise level of the vehicle.

Furthermore, hill descent conditions, especially with high payloads/trailer loads, challenge the thermal capacity of a braking system on an EV. This is specifically applicable to scenarios when the RESS is at/near 100% SOC. In certain scenarios, regenerative braking capability may be limited, leading to additional stress on wheel brakes. By dissipating extra energy in the form of motor and inverter loss via motor control, less energy is required to be burned up by the brake system, which also helps releasing the thermal capacity of the brake system.

A benefit of employing may include being able to downsize or remove an RESS heater. Furthermore, electric energy generated during regenerative operation may be directed to heat generation when the RESS is at a fully charged state, such as may occur when operating on a downhill. Manipulation of the flux level in the flux intensifying direction to generate heat may increase losses while achieving better or equivalent NVH performance. Manipulation of the flux level in the flux intensifying direction may achieve a smooth transition in or out of flux heating operation without sacrificing desired torque dynamics. Furthermore, multiple heat configurations may be embedded in the system to accommodate operator requests.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The term "controller" and related terms such as microcontroller, control, control unit, module, processor, etc., refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices. The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and similar signals that are capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value. The term "model" refers to processor-based or processor-executable code and associated calibration that simulates a physical existence of a device or a physical process.

While the above disclosure has been described with reference to embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but include embodiments falling within the scope thereof.

What is claimed is:

1. A method for operating an electric drive unit including a rechargeable energy storage system (RESS) that is electrically connected to an inverter that is operatively coupled to a polyphase alternating current (AC) motor, the method comprising:

receiving a torque command corresponding to a torque to be produced by the AC motor;

receiving a heat level request corresponding to a heat to be generated within the electric drive unit;

determining a voltage level for the RESS;

determining an initial current command for operating the AC motor that is responsive to the torque command based upon the voltage level for the RESS;

determining a flux level in a flux-intensifying region that is responsive to the heat level request;

determining a final current command based upon the initial current command and the flux level, wherein the final current command is responsive to the torque command and to the heat level request, and wherein the final current command includes operating in the flux-intensifying region; and commanding operation of the inverter responsive to the final current command.

2. The method of claim 1, wherein the flux-intensifying region is determined in relation to a Maximum Torque Per Ampere (MTPA) curve.

3. The method of claim 1, wherein determining the final current command that is responsive to the torque command and to the heat level request, wherein the current command includes operating in the flux-intensifying region relative to a Maximum Torque Per Ampere (MTPA) curve comprises:

determining a plurality of candidate current trajectories, wherein each of the plurality of candidate current trajectories is in the flux-intensifying region relative to the MTPA curve and are capable of producing the torque command in the AC motor;

determining a plurality of flux levels corresponding to the plurality of candidate current trajectories; and selecting one of the plurality of candidate current trajectories that corresponds to one of the plurality of flux levels that is capable of producing the heat level request.

4. The method of claim 3, wherein the plurality of candidate current trajectories are determined based upon the torque command in the AC motor.

5. The method of claim 3, further comprising determining, for the plurality of candidate current trajectories, a parameter associated with noise-vibration-harshness (NVH); and determining, via the controller, the final current command that is responsive to the torque command, and optimizes the heat level request in relation to the parameter associated with NVH while operating in a flux-intensifying region.

6. The method of claim 3, wherein the plurality of candidate current trajectories are determined by referencing pairs of current magnitudes and phase angles defining current vectors, and resolving the current vectors into respective direct-axis current components and quadrature-axis current components.

7. An apparatus for generating heat in a vehicle, comprising:

an electric drive unit having a polyphase alternating current (AC) motor and an inverter, wherein the inverter is operatively coupled to the AC motor;

a rechargeable energy storage system (RESS), wherein the RESS is electrically connected to the inverter to transfer electric power therebetween; and a motor controller, wherein the motor controller is operatively coupled to the inverter;

the motor controller including an instruction set, the instruction set being executable to:

receive a torque command corresponding to a torque to be produced by the AC motor;

receive a heat level request corresponding to a magnitude of heat to be generated within the electric drive unit;

determine a voltage level for the RESS;

determine an initial current command for operating the AC motor that is responsive to the torque command based upon the voltage level for the RESS;

determine a flux level in the flux-intensifying region that is responsive to the heat level request;

determine a final current command based upon the initial current command and the flux level, wherein the final current command is responsive to the torque command and to the heat level request, wherein the final current command includes operating in a flux-intensifying region, and wherein the flux-intensifying region is determined in relation to a Maximum Torque Per Ampere (MTPA) curve; and command operation of the inverter responsive to the final current command.

8. The apparatus of claim 7, wherein the instruction set being executable to determine the final current command that is responsive to the torque command and to the heat level request comprises the instruction set being executable to:

determine a plurality of candidate current trajectories, wherein the plurality of candidate current trajectories are in the flux-intensifying region relative to a Maximum Torque Per Ampere (MTPA) curve, are capable of producing the torque command in the AC motor, and are capable of generating the heat level request;

determine a plurality of flux levels corresponding to the plurality of candidate current trajectories; and determine, as the final current command, one of the plurality of candidate current trajectories that corresponds to a maximum of the plurality of flux levels.

9. The apparatus of claim 7, wherein the instruction set being executable to determine the final current command that is responsive to the torque command and to the heat level request, wherein the current command includes operating in the flux-intensifying region relative to a Maximum Torque Per Ampere (MTPA) curve comprises the instruction set being executable to:

determine a plurality of candidate current trajectories, wherein the plurality of candidate current trajectories are in the flux-intensifying region relative to the MTPA curve and are capable of producing the torque command in the AC motor;

determine a plurality of flux levels corresponding to the plurality of candidate current trajectories; and select one of the plurality of candidate current trajectories that corresponds to one of the plurality of flux levels that is capable of producing the heat level request.

10. The apparatus of claim 9, wherein the plurality of candidate current trajectories are determined based upon the torque command in the AC motor.

11. The apparatus of claim 9, further comprising the instruction set being executable to:

determine, for the plurality of candidate current trajectories, a parameter associated with noise-vibration-harshness (NVH); and determine the final current command that is responsive to the torque command and optimizes the heat level request in relation to the parameter associated with NVH while operating in a flux-intensifying region.

12. The apparatus of claim 7, further comprising a heat exchanger, the heat exchanger being thermally coupled to the inverter; wherein the heat exchanger is arranged to transfer heat to a vehicle cabin.

13. The apparatus of claim 7, further comprising a rechargeable energy storage system (RESS), the RESS being thermally coupled to the inverter; wherein the inverter is arranged to transfer heat to the RESS.

14. The apparatus of claim 7, wherein the inverter is composed of a plurality of solid-state power switches, and wherein the motor controller is further configured to control a switching frequency of the plurality of solid-state power switches to generate heat within the inverter.

15. A method for operating an electric drive unit including an inverter operatively coupled to a polyphase alternating current (AC) motor, the method comprising:
 receiving a torque command corresponding to a torque to be produced by the AC motor;
 receiving a heat level request corresponding to a magnitude of heat to be generated within the electric drive unit;
 determining a voltage level;
 determining an initial current command for operating the AC motor that is responsive to the torque command based upon the voltage level;
 determining a flux level in a flux-intensifying region that is responsive to the heat level request;
 determining, via a controller, a final current command based upon the initial current command and the flux level, wherein the final current command is responsive to the torque command and optimizes the heat level request in relation to a parameter associated with noise-vibration-harshness (NVH); and
 commanding operation of the inverter responsive to the final current command.

16. The method of claim 15, wherein determining the current command that is responsive to the torque command and optimizes the heat level request in relation to the parameter associated with NVH while operating in a flux-intensifying region comprises determining a current command that includes operating in a flux-intensifying region relative to a Maximum Torque Per Ampere (MTPA) curve.

17. The method of claim 15, further comprising a heat exchanger, the heat exchanger being thermally coupled to the inverter; wherein the heat exchanger is arranged to transfer heat to a vehicle cabin.

18. The method of claim 15, further comprising a rechargeable energy storage system (RESS), the RESS being thermally coupled to the inverter; wherein the inverter is arranged to transfer heat to the RESS.

19. The method of claim 15, wherein the inverter is composed of a plurality of solid-state power switches, and wherein the motor controller is further configured to control a switching frequency of the plurality of solid-state power switches to generate heat within the inverter.

* * * * *